B. BALG.
PROCESS OF MAKING HOLLOW ARTICLES FROM PLASTIC MATERIAL.
APPLICATION FILED JUNE 18, 1910.
1,012,232.
Patented Dec. 19, 1911.
2 SHEETS—SHEET 1.
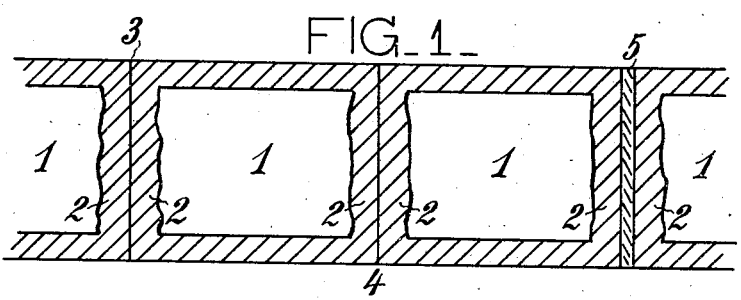
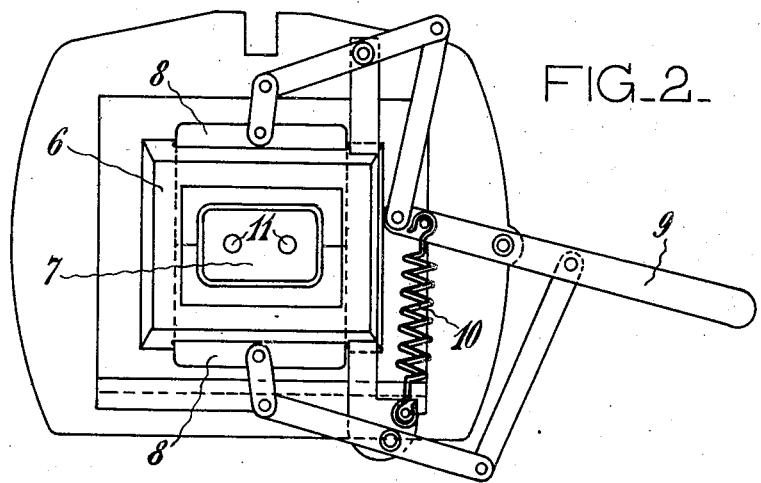
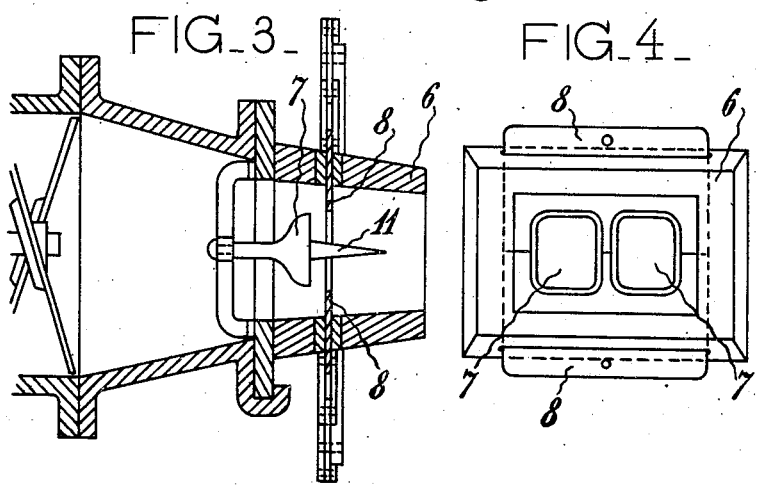
WITNESSES:
INVENTOR,
BERNHARD BALG,
by
Attorney.

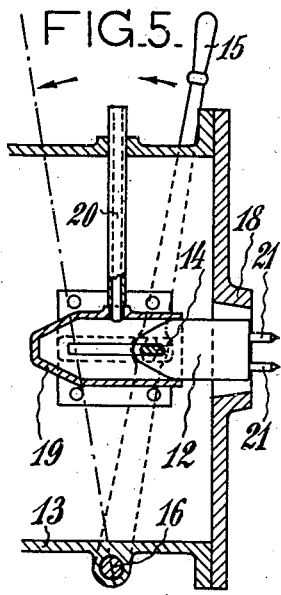
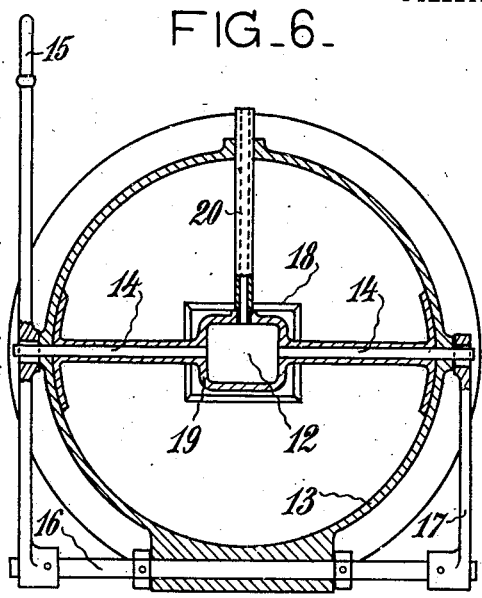
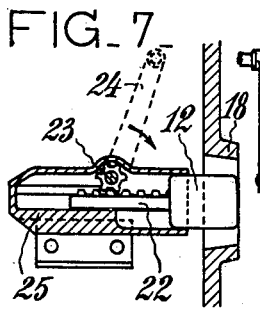
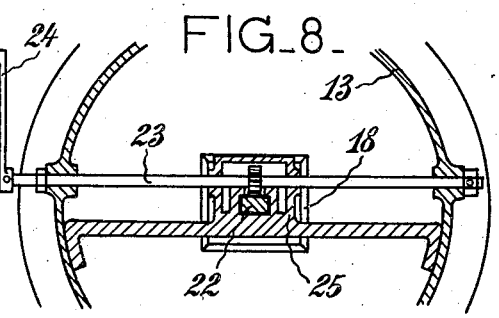
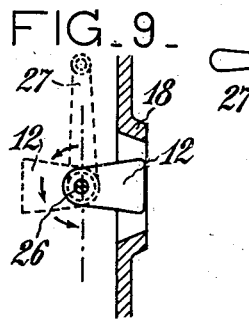
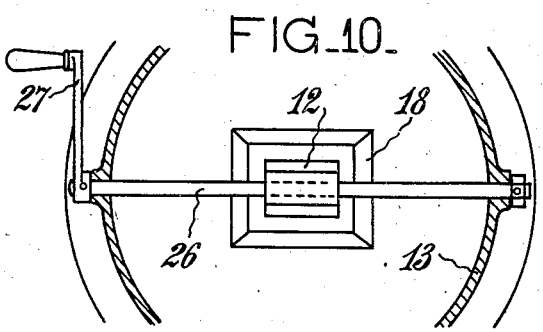

UNITED STATES PATENT OFFICE.

BERNHARD BALG, OF GÖRLITZ, GERMANY.

PROCESS OF MAKING HOLLOW ARTICLES FROM PLASTIC MATERIAL.

1,012,232.   Specification of Letters Patent.   Patented Dec. 19, 1911.

Original application filed August 17, 1909, Serial No. 513,281. Divided and this application filed June 18, 1910. Serial No. 567,629.

*To all whom it may concern:*

Be it known that I, BERNHARD BALG, a subject of the German Emperor, residing at Görlitz, Germany, have invented a new and useful Process of Making Hollow Articles from Plastic Material; and I do hereby declare the following to be a full, clear, and exact description of the same.

This application is a division of my application, Serial No. 513281, filed August 17th, 1909, for Letters Patent of the United States.

For a long time attempts have been made to produce by machinery, in a simple manner, hollow articles, such as building blocks closed on all sides. The process constituting the subject of the present invention solves this problem, by causing a stream of plastic material to issue from a press in a connected series of alternately succeeding internally hollow and solid portions, and then dividing the said stream transversely, in order to produce a hollow building block or other hollow article, in one operation.

The process for the formation of the series of alternately succeeding solid and hollow portions, may be assured with any of the illustrated apparatus. For instance, slides or the like may be introduced at determined intervals into the hollow stream formed in the press so as to arrest its progress, whereby the material is caused to form each time a solid portion at that place. Or cores may be employed for making the hollow portions and may be made movable in such a manner that they can be removed temporarily from their position, whereby the plastic material is caused to form a solid stream at that place.

The accompanying drawings illustrate, in Figure 1 a diagrammatic longitudinal section of the stream of plastic material as it issues from the press. The remaining figures illustrate details of apparatus for providing a stream of plastic material having alternating hollow and solid portions. Referring to Fig. 1, a hollow portion, 1, alternates with a solid portion, 2, throughout the length of the said stream. The stream is separated, transversely, in the usual manner, by means of any of the usual devices, through the solid portions, 3 and 4, into the desired blocks which are formed closed on all sides, without any further operations. When it is desired that the blocks shall have very thin end walls, the separation of the stream may be effected by means of two wires stretched apart side by side, as indicated at 5. The stream may, however, be separated into blocks or other hollow articles, in any other way.

Several examples of apparatus useful in the practice of the new process are illustrated in the accompanying drawings. In the examples shown in Figs. 2, 3 and 4, the alternately succeeding solid portions, or webs, are formed in the stream of plastic material issuing from the press by the insertion of slides into the stream, at determined intervals of time. In the examples shown in Figs. 5 to 10 they result from the temporary removal of the core or cores.

Fig. 2 is a front elevation, and Fig. 3 is a vertical longitudinal section of the mouthpiece of a brickmaking press. Fig. 4 is a front elevation of a mouthpiece with two cores, the fixing plate being omitted. Fig. 5 is a vertical longitudinal section, and Fig. 6 is a vertical cross section through the mouthpiece of a press having a movable core. Figs. 7 and 8 are, respectively a vertical longitudinal section and a vertical cross section of a second modification; and Figs. 9 and 10 are corresponding views of a third modification.

Referring first, to Figs. 2 to 4, one or more cores, 7, according to the desired number of internal cavities which the blocks are to have in the transverse direction are arranged in the mouthpiece 6 of the press. These cores, which may have any desired shape and cross section, are preferably fixed in the mouthpiece; but they may be movable, if so desired, and as shown in Figs. 5-10. Two slides, 8, (Figs. 2-4) are arranged in the mouthpiece a short distance in front, or advance, of the core or cores, 7, in such a manner as to be capable of being moved relatively to each other so that they can be moved into or out of the mouthpiece. These movements may be effected by means of a hand lever, 9, through the medium of suitable lever mechanism. A spring, 10, acting upon the lever 9, has a tendency to maintain the slides normally out of the mouthpiece. The slides are formed, according to the number of cores employed, with one or more cut-away portions or openings which are slightly larger than the cores and of a form similar to the cross-section of the cores. The mouthpiece is continued outward beyond the slides, so as to form a guide for the stream of plastic material as it issues from the press. The core, or cores, may be provided with conically pointed pins, 11, of any desired cross section for the purpose of piercing airholes in the webs or solid portions of the blocks. When the slides 8 are removed from the mouthpiece a hollow stream of plastic material issues, in the usual manner, from the press. The slides are then moved into contact with each other, at determined intervals of time. By this means, the progress of the stream of material is arrested, so that the material accumulates at or behind the slides, while a portion of the material enters through the opening, still left between the slides, into the hollow stream situated in front of the slides, and thus goes to form a solid portion, or web, at the end of the said hollow stream. When the slides are removed, the stream issues in its hollow form, as before. Any other movable parts may be employed instead of the slides.

The stream is separated into its several portions by means of any usual cutting devices. These latter may be connected to the lever 9 in such a manner that when they are operated they also cause the said lever to operate. The resulting stream may be divided at any points. Thus, as shown in Fig. 1, the cuts may be made (at 3, 4) through the webs, 2, to produce hollow building or other blocks closed on all sides, or the cuts may be made instead or also at the thinner parts of the stream, to produce pots or other hollow articles. It will also be understood, that the cuts may be made at such points that the product will have a succession of hollow spaces and webs.

The apparatus will preferably have means whereby the outlet area of the exit mouthpiece may be varied, at desired intervals of time, in order that the plastic material (which normally issues in tubular form from the mouthpiece) may be held back, diverted, or otherwise manipulated, to the end that, at said intervals, the plastic material shall come together to form solid portions, such as webs in or ends of hollow blocks or other hollow articles.

In Figs. 2 and 3, I have shown the effecting of this result by means of a stationary core (or cores) and relatively-movable slides, 8, having cut-away portions. However, the process may be practiced by employment of an apparatus without these slides, but with a core (or cores) movable into, or advanced toward, the exit mouthpiece, to give tubular form to the issuing stream of plastic material, and removable from such position to permit the plastic material, as it issues, to come together. This removal of the cores may be effected in various ways, three arrangements for this purpose being illustrated in Figs. 5 to 10.

In the construction shown in Figs. 5 and 6, the core, 12, is carried by a rod, 14, extending transversely through the press head 13. On one end of this rod, externally of the press head, there is mounted (with some play) the hand lever, 15, which is fixed on a shaft, 16, that is mounted below the press head and is capable of rocking in its bearing. On the opposite end of the shaft 16, there is fixed a second lever, 17, which is also arranged to act upon the rod 14 with a slight amount of play. On moving the hand lever 15, the rod is consequently moved, together with the core 12, uniformly in either direction. The core 12 projects into the mouthpiece, 18, of the press and is guided with a tight joint in a closed casing, 19, which is formed in each side with a slot for the passage of the rod 14. The rod 14 is likewise guided either in lateral extensions of the casing 19, or in a separate casing (Fig. 6). The casing 19 is fitted with a pipe, 20, which serves for conveying water or oil and for the escape or the admission of air. The core 12 is (see Fig. 5) provided, in front, with one or more pins, 21, which are pointed conically at their ends and serve to form air holes in the webs or solid portions of building blocks or other articles. These pins may have any desired cross section.

In the construction shown in Figs. 7 and 8, for practicing the process, the core 12 is provided with a rack, 22, with which engages a pinion mounted on a shaft, 23. On the outer end of this shaft 23, is a crank 24 by means of which the core can be moved back and forth. The rack and the pinion are inclosed in a casing, 25, in which the core 12 is guided with a tight joint.

In the construction shown in Figs. 9 and 10, the core 12 is mounted so as to be capable of rotating with an axle, 26, on the end of which, situated outside the presshead, is a crank handle, 27. By turning this crank handle, in the direction of the arrows shown in Fig. 9, the core can be turned back into the position shown in dotted lines (to permit the stream to unite) and also forward again into the working position, or that shown in full lines, to compel the plastic material to issue in tubular form from the mouthpiece 18.

In the construction shown in Figs. 5 to 10, the forming of the solid portions in the stream of plastic material issuing from the press is effected by removing the core or cores temporarily from the mouthpiece. When the cores are moved back—drawn from the mouthpiece—the great pressure exerted by the press produces a solid portion in the issuing stream. After the cores have been moved forward again, the plastic material continues to issue as a hollow stream. Pins, such as 21, are so mounted, in any suitable manner, as to be capable of movement in the mouthpiece. When the cores are provided with these pins 21, the latter pierce the previously-formed solid portion of the stream from behind and thus, as before outlined, form air holes in the abutting ends of the two adjacent hollow blocks that are subsequently separated from each other.

The process may be availed of for the production of all kinds of building or other blocks closed on all sides, or other hollow articles, from any plastic material and the said blocks may be formed with one or more internal cavities by employing the device of Fig. 5, which has a plurality of cores.

The apparatus herein described constitutes the subject-matter of my application, Serial No. 513281, filed August 17th, 1909.

What I claim, is:

1. The process of making hollow articles from plastic material, said process consisting in ejecting from a nozzle a hollow plastic stream closed at all sides, and at intervals forcing material into said stream to form a web therein, whereby hollow parts and intervening webs are formed.

2. In the manufacture of articles of plastic material, the method which consists in ejecting the plastic material from a nozzle of a press, and varying the shape of said outlet, at desired intervals, to produce a plastic stream having a succession of tubular hollow parts and intervening webs.

3. In the manufacture of articles of plastic material, the method which consists in moving the plastic material between forming devices, and varying the relative position of said devices, at desired intervals, to produce a plastic stream having a succession of tubular hollow parts and intervening webs.

4. The process of making hollow articles from plastic material, consisting in causing the plastic material to issue under pressure from a suitable orifice, and in varying the form of said orifice, at desired intervals of time, to produce a stream of plastic material in tubular form provided with suitably-spaced intervening webs.

5. The process of making hollow articles from plastic material, consisting in causing the plastic material to issue under pressure and in tubular form from a suitable orifice, and in intercepting the moving stream of plastic material to provide a succession of hollow portions and intervening webs.

6. The process of making hollow articles from plastic material, consisting in causing the plastic material to issue between a core and a mouthpiece alined therewith, for producing a tubular stream of plastic material and interrupting said stream, at desired intervals of time, to provide the stream with suitably-spaced intervening webs.

7. The process of making hollow articles from plastic material, consisting in causing the plastic material to issue under pressure and in tubular form from a suitable orifice, intercepting the moving stream of plastic material to provide a succession of hollow portions and intervening webs, and providing openings through said webs while forming the same.

8. The process of making hollow articles from plastic material, consisting in causing the plastic material to issue under pressure from a suitable orifice, and in varying the form of said orifice, at desired intervals of time, to produce a stream of plastic material in tubular form provided with suitably-spaced intervening webs, and provided with openings through said webs, while forming the same.

In testimony whereof, I have signed my name to this specification in the presence of two subscribing witnesses.

BERNHARD BALG.

Witnesses:
 WOLDEMAR HAUPT,
 HENRY HASPER.